United States Patent [19]

Hanna et al.

[11] Patent Number: 5,514,352
[45] Date of Patent: May 7, 1996

[54] APPARATUS FOR HIGH SPEED AIR OXIDATION OF ELEMENTAL PHOSPHOROUS WASTES IN AQUEOUS MEDIUM

[76] Inventors: John Hanna, 5444 Woodbury La., Tuscaloosa, Ala. 35405; Joon-Oh Jung, Hoseo University, Dept. of Environmental Engineering,, 29-1 Sechul-Ri, Baebang-myun, Asan-kun, Chung-nam, Rep. of Korea

[21] Appl. No.: 270,710

[22] Filed: Jul. 1, 1994

Related U.S. Application Data

[62] Division of Ser. No. 131,721, Oct. 5, 1993.

[51] Int. Cl.$^6$ .................................................. B01F 3/04
[52] U.S. Cl. ...................... 422/225; 422/227; 366/102; 261/93; 588/246; 423/322
[58] Field of Search ............................. 422/184, 225, 422/227; 366/102; 261/93; 210/703, 219, 221.2; 588/205, 208, 246; 423/310, 313, 322, 323

[56] References Cited

U.S. PATENT DOCUMENTS

| | | | |
|---|---|---|---|
| 2,138,349 | 11/1938 | Mallory | 210/8 |
| 3,515,515 | 6/1970 | Hinkebein | 23/223 |
| 3,650,950 | 3/1972 | White | 210/60 |
| 3,684,461 | 8/1972 | Muller et al. | 23/293 R |
| 3,971,707 | 7/1976 | Deshpande | 204/149 |
| 4,101,286 | 7/1978 | Nago et al. | 422/169 |
| 4,152,409 | 5/1979 | Nago et al. | 423/659 |
| 4,174,280 | 11/1979 | Pradt et al. | 210/60 |
| 4,284,515 | 8/1981 | Liu | 210/724 |
| 4,402,833 | 9/1983 | Bennett et al. | 210/667 |
| 4,427,489 | 1/1984 | Jacobsen | 162/57 |
| 4,548,765 | 10/1985 | Hultholm et al. | 261/93 |
| 4,582,612 | 4/1986 | Long, Jr. | 210/760 |
| 4,595,492 | 6/1986 | Crea et al. | 209/2 |
| 4,643,852 | 2/1987 | Koslow | 261/93 |
| 4,648,973 | 3/1987 | Hultholm et al. | 210/629 |
| 4,686,094 | 8/1987 | Roberts et al. | 423/322 |
| 4,689,121 | 8/1987 | Morgan | 203/14 |
| 4,698,216 | 10/1987 | Lay | 423/317 |
| 5,366,698 | 11/1994 | Smith et al. | 422/168 |

OTHER PUBLICATIONS

Barber, J. C., Waste Effluent; Treatment and Reuse, Chem. Eng. Prog., vol. 65, No. 6 (Jun. 1969).
Bullock et al., Decomposition of Phosphorous in Water, Proc. Conf. Poll. Chem. Inst. Can., Halifax, N.S., Canada, pp. 23–24 (Aug. 1969).
Sullivan, et al., A Summary and Final Evaluation of Aquatic Environmental Data in Relation to Establishing Water Quality Criteria For Munitions–Unique Compounds; Part 3: White Phosphorous, Water and Air Research, Inc., Gainesville, FL (Apr. 1979).
Semenoff, N., Kinetics of Chain Reactions, Chemical Reviews, vol. VI, No. 3, pp. 347–379.
Hanna, J. et al., Phosphorous Removal by Dispersed Air Oxidation, Minerals & Metal. Proc. pp. 200–204 (Nov. 1992).
Hanna, J. et al., Remediation of Phosphorus from Electric Furnace Waste Streams, Proc. of HMC–South '92, New Orleans, La., pp. 34–39 (Feb. 1992).

*Primary Examiner*—Timothy M. McMahon
*Assistant Examiner*—N. Bhat
*Attorney, Agent, or Firm*—Deveau, Colton & Marquis

[57] ABSTRACT

Apparatus and process for high speed air dispersion (HSAD) and oxidation of elemental phosphorus in aqueous medium. The HSAD apparatus is an element used in a process designed for treating the highly toxic and hazardous phosphorus sludge wastes with oxygen-containing gas microbubbles at high shear rates in which the elemental phosphorus is quantitatively converted to soluble oxyphosphorus compounds which can be recovered after neutralization as fertilizer by products or disposed of as inert nonhazardous landfill material.

2 Claims, 4 Drawing Sheets

APPARATUS FOR HIGH SPEED AIR OXIDATION OF ELEMENTAL PHOSPHOROUS WASTES IN AQUEOUS MEDIUM

This is a divisional of copending application Ser. No. 08/131,721, filed on Oct. 5, 1993.

BACKGROUND OF THE INVENTION

1. Field of the Invention

The invention generally is a process and apparatus for the treatment, remediation, handling, and disposal of hazardous wastes containing elemental phosphorus. The invention more specifically is a process, referred to as high speed air dispersion (HSAD), which is fast, simple and cost effective for complete conversion of the $P_4$-pollutants to strongly acidic solutions which may react and/or fix other leachable toxic heavy metal contaminants in the sludge or soil residue, thereby remediating a $P_4$-pollutant containing material, and an apparatus for use in the process for remediating the $P_4$-pollutants.

2. Prior Art

Numerous methods have been explored for removing phosphorus and phosphorus oxy-compounds from municipal and industrial wastes, such as phosphorus sludges, phosphorus-containing soil, and phosphorus-containing waste waters (often referred to as phossy water). However, data regarding the removal of elemental phosphorus from phossy water and phosphorus sludges are rather limited. An extensive literature review on this subject was made by J. D. Fleming, *Removal of Phosphorus, A Literature Survey*, Tennessee Valley Authority, Muscle Shoals, AL (1970 TVA Report). Most of the reported techniques involve the removal of dissolved phosphorus by chemical precipitation, ion exchange, reverse osmosis, bacterial treatment, and combined chemical-biological treatment. This prior art includes several chemical and physical processes for treating phossy water and $P_4$ sludges. The chemical treatment methods include air oxidation, chlorine oxidation, electrolytic oxidation, catalytic oxidation, distillation, and $CS_2$ extraction. The physical methods include sizing, sedimentation, centrifugation, cycloning, and flotation. In most of these processes, phosphorus is only partially separated or oxidized from the solid impurities, or high temperatures are needed to volatilize elemental phosphorus and water leaving a phosphorus free residue.

A waste water treatment method is disclosed in an article by J. C. Barber in Chemical Engineering Progress, Vol. 65, No. 6, June 1969, entitled *Waste Effluent Treatment and Reuse*. In this method the elemental phosphorus is reduced from 1.5–2.4 ppm to about 0.05 ppm in a combined clarification and chlorination technique to remove elemental phosphorus from phossy water. Unfortunately, the toxic nature of the residual chlorine in the resulting waste water is disadvantageous and limits the usefulness of this technology. The oxidation of phosphorus in the phossy water with air is reported in the article, specifically laboratory tests made with 134–492 cubic ft. of air/1,000 gallons of waste water oxidized about 63–86% of the phosphorus leaving 0.3–0.7 ppm $P_4$ in the aerated water. The article reports that neither the time of aeration nor the volume of air used affects the extent of oxidation and this method does not provide a complete phosphorus removal treatment. No details are given regarding the method and intensity of pulp mixing.

U.S. Pat. No. 4,686,094 discloses a process of treating pyrophoric phosphorus-containing material with oxygen-containing gas to convert it to substantially less pyrophoric form while otherwise protecting the pyrophoric phosphorus with a blanket of non-flammable fluid (i.e. water). This method makes no mention of high shear agitation and is shown to remove only 95% of the phosphorus in the sludge after six months reaction. On the contrary, the present invention results in up to 100% phosphorus removal in as few as 100 minutes or fewer.

U.S. Pat. No. 3,515,515 discloses the use of an oxidizing agent in the reduction of phosphorus from phosphorus-containing sludge. However, this reference teaches the use of compounds other than oxygen as the oxidizing agent. In addition, the '515 patent utilizes agitation with agitator speeds being two orders of magnitude lower than the present invention, resulting in significantly less intimate mixing and contact between the sludge and the oxidant, and significantly less phosphorous removal.

U.S. Pat. No. 3,650,950 discloses an apparatus for shear mixing and aeration of sewage. The '950 patent describes the use of a critical shearing zone into which ozone, air, or oxygen are injected, but claims an active agent as the oxidative species. The '950 patent discloses that shearing of the waste material makes it more receptive to dissolved oxygen, microbial or bacterial action, oxidation of solids and aeration. In addition, the '950 patent discloses that high solids loadings then become possible. However, no mention is make of the specific use for recovering phosphorus from phosphorus-containing sludge, and was developed for conventional sewage treatment.

U.S. Pat. No. 2,138,349 discloses a method of aeration of sewage involving top-to-bottom circulation of the medium and bubbling of oxygen through the medium. The '349 patent does not disclose the use of high shear mixing to distribute the oxygen; however, it does mention that an important step in the aeration of sewage is agitation to expedite oxidation, and that the degree of purification of the sewage depends in part on adequacy of mixing to ensure contact between the sewage and sludge surfaces and in part on the sufficiency and adequate distribution of oxygen in dissolved form to properly support chemical reactions taking place. The '349 patent does not disclose the use of high shear mixing to create microbubbles and for intimate mixing of the microbubbles with a phosphorus-containing waste.

U.S. Pat. No. 4,582,612 discloses an apparatus for treating sewage sludge by breaking the sludge into minute particles and dispersing them into an oxygen-rich pressurized atmosphere. The present invention is an atmospheric pressure process, and does not entail the disadvantages of a pressure process, such as increased material costs and lower safety.

U.S. Pat. No. 4,174,280 discloses a process for the aqueous oxidation with an oxygen-containing gas of an oxidizable material which is insoluble, immiscible, and difficult to suspend or emulsify in water, and is limited to a group consisting of motor oils, diesel fuels, explosives, and propellants.

U.S. Pat. No. 4,648,973 discloses a method to oxidize sludge with high solids content utilizing a counter-bubble reactor in which oxygen is injected into the upper part of the reactor and circulated by sludge flow only. No mechanical agitation is used.

U.S. Pat. No. 4,698,216 discloses a method for reacting phosphorus-containing material and an oxygen-containing gas, both in finely-divided form, to produce aqueous $H_3PO_4$. The '216 patent reaction takes place under a protective aqueous layer, protecting the phosphorus from direct contact with atmospheric oxygen. The present invention actually uses air, including atmospheric oxygen, as the preferred reactive gas, and does not require a protective aqueous layer.

In addition, U.S. Pat. Nos. 3,684,461; 4,284,515; 4,402,833; 4,689,121; and 4,595,492 disclose methods for removing phosphorus from an aqueous medium. In all cases, the methods are non-oxidative and use a variety of techniques for the removal of phosphorus, including the addition of caustic soda, lime, and physical separation methods such as centrifuging, flash evaporation, and filtration. Thus it can be seen that there is a need for a low cost, fast, and efficient method and apparatus for the complete conversion of phosphorus contained in wastes to less hazardous, less toxic, and/or more useable materials.

BRIEF SUMMARY OF THE INVENTION

The novel apparatus used to carry out the process of the invention is a high speed air dispersion reactor, or HSAD reactor. The HSAD reactor is specifically designed to effect a fast and complete oxidation reaction between dissolved or suspended elemental phosphorus ($P_4$) pollutants in an aqueous medium and a finely divided stream of oxygen-containing gas (typically air). The reactor is a deep column reactor consisting of two sections: the first section comprises a high shear/high intensity agitation and air dispersion zone at the bottom of the reactor; and the second section comprises a low shear bubble hold up zone mounted at the top of the reactor. The lower section or zone, referred to herein as the dispersion zone, is equipped with a propeller agitator comprising agitation blades. Air or another oxygen-containing gas is injected into the HSAD reactor through a sparger directed toward the agitation blades. The gas stream is instantly subdivided into micron-sized dispersed bubbles, or microbubbles, which are intimately mixed with the $P_4$-containing material, typically a sludge, slurry or phossy water, in the dispersion zone. The high shear agitation may be achieved by a high speed blender type agitator or a high shear pump.

The upper low shear bubble hold up and mixing zone, referred to herein as the mixing zone, is a well-baffled cylindrical tube with air, sludge feed, and wash water injection ports and an off gas outlet. This section of the HSAD reactor is designed to ensure uniform and gentle mixing of the $P_4$-containing material and to serve as a froth column hold up region for increasing the contact time and solubility of the gaseous oxyphosphorus products, e.g. $P_2O_5$ and $P_2O_3$, in the aqueous phase. The unreacted and/or undissolved gases are passed through a water condenser and then a gas bubbles scrubber containing a strongly alkaline solution of KOH or NaOH to scrub any acidic fumes from the off gas stream.

The process involves three major steps: first, physical processing pretreatment and recovery of coarse $P_4$ particles; second, HSAD wet oxidation treatment of the residual $P_4$ in the fines; and third, processing of downstream products. Generally the technology involved in the first and third steps are well established; therefore, attention is focused on the HSAD treatment technology. The process includes the oxidization and conversion of the highly toxic $P_4$-pollutants to non-hazardous oxyphosphorus compounds that are easy to recover and/or remove from the wastes and to produce environmentally acceptable landfill material or non-hazardous wastes.

For the treatment of sludges containing relatively low $P_4$ contents, typically those sludges having less than 1% $P_4$, and for soil remediation, the system can be reduced to two steps: first, the physical pretreatment; and second, the HSAD wet oxidation step modified by the addition of a neutralizing material. The treated acidic sludge or soil in the second step is neutralized by a hydrated lime injected into the mixing zone of the HSAD reactor. In the case of phosphorus contaminated water or phossy water containing 500 ppm $P_4$ or less, only the modified second step, HSAD oxidation/neutralization, is required.

For the treatment of sludge containing relatively high $P_4$ contents, typically those sludges having more than about 5–10% $P_4$, wet basis, the $P_4$-contaminated waste material is initially slurried, attrition scrubbed, and wet screened to prepare a uniformly sized feed to the HSAD reactor and to recover any $P_4$-enriched coarse particles suitable for recycling. The fine size material is diluted with water or recycled dilute phosphoric acid or another aqueous medium and treated in the HSAD reactor with a stream of finely dispersed air/oxygen bubbles. The dissolved oxygen reacts quickly and exothermically with the $P_4$-contaminants forming white fumes of water soluble oxyphosphorus compounds. Some fumes report to the off gas steam and are scrubbed by a strong alkaline solution.

An almost complete oxidation is achieved when the evolution of white oxyphosphorus fumes cease and the sludge temperature starts to decline. The time required for complete oxidation reaction depends on the $P_4$ content of the sludge. Finally, the treated sludge solids settle quickly, leaving a clear supernatent acid solution. Solid/liquid separation of the treated sludge can be achieved by thickening followed by filtration and/or centrifugation and washing using fresh water. Such solid/liquid separation techniques are well-known in the art. The washed solid residue may be air dried and then, or may be directly, disposed of as landfill. The thickener overflow consists mainly of a clear concentrated acidic solution ($H_3PO_4$) which can be neutralized by ammonia, KOH, NaOH, or lime to produce liquid fertilizer products that can be flash dried to a finished fertilizer by-product. The wash water (dilute $H_3PO_4$ acid) may be mixed with phossy water for recycling. The scrubbed phosphorus oxide fumes may be combined with the neutralized $H_3PO_4$ and recovered as a fertilizer by-product. The scrubbed vent gas is clean and can be released into the atmosphere.

DETAILED DESCRIPTION OF THE PREFERRED EMBODIMENT

Figure 1:
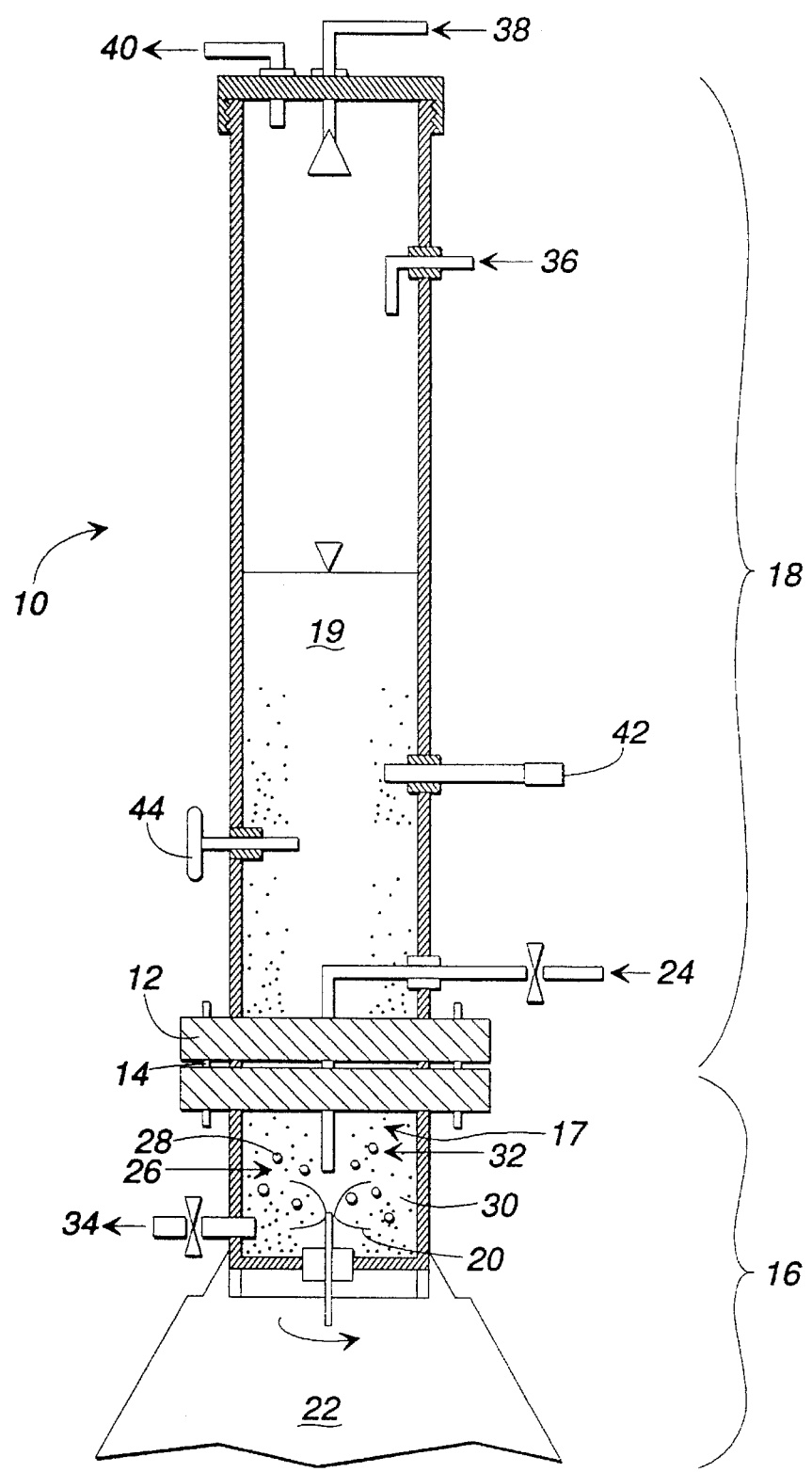
FIG. 1 is a schematic diagram, in section, of the high speed air dispersion reactor of the present invention.

The present invention relates to a new reactor and process for treatment, removal, and possible recovery of elemental phosphorus, $P_4$, from water, aqueous, and sludge wastes containing elemental phosphorus. The present invention is particularly useful for remediating elemental phosphorus containing wastes generated during electrothermal reduction of phosphate rock. This invention also is applicable to $P_4$-contaminated wastes generated during the production of munitions wherein elemental phosphorus is the starting material, such as in the manufacture of binary nerve gas and smoke screen shells. These wastes include water and soil contaminated during handling, training and/or demolition of $P_4$-based chemical weapon systems.

Generally, the $P_4$-contaminated wastes are highly toxic to animal, plant and human lives because of the high reactivity of phosphorus (dissolved or present as solid particles) towards dissolved oxygen in moist soil and aqueous sludges. When dried, the $P_4$ in the wastes reacts spontaneously with atmospheric oxygen and produces toxic acidic $P_2O_5$ fumes and becomes flammable. Therefore, phosphorus-containing materials are stored and handled under water to avoid fire and acidic fume hazards. Disposal of such hazardous wastes require storage in special containment vessels, sumps or carefully designed impoundments. Federal regulations prohibit permanent storage of flammable wastes.

Elemental phosphorus is used primarily in both the chemical and the food industries to produce specialty chemicals, detergents, and food grade preservatives. At present time, $P_4$ finds only limited application in the fertilizer industry which uses the more cost effective wet phosphoric acid. Some elemental phosphorus also is used for military purposes such as manufacturing of chemical weapons and smoke screen munitions.

Phosphorus is produced by the reduction of phosphate rock mixed with coke and silica, the latter acting as a flux for the calcium present in the rock. The reaction typically is undertaken in an electric furnace at 1400° C. The resulting phosphorus is vaporized, removed from the furnace, cleaned by electrostatic precipitations, and condensed by direct contact with water to form an aqueous phosphorus slurry. When settled in collection tanks or sumps, the phosphorus condensate separates into three layers: a bottom layer of clean elemental phosphorus; an intermediate layer of phosphorus sludge; and an upper layer of water containing dissolved and suspended colloidal phosphorus known as phossy water.

The phosphorus sludge bottom layer consists of an emulsion of phosphorus globules and water stabilized by varying amounts of untrapped dust particles and some volatile organic matter from the phosphate rock. The average composition is about 50% $P_4$, 40% water, and 10% dust, by weight, which escaped from the furnace electrostatic precipitators. The water phase upper layer contains various amounts of soluble fluoride (100–1000 ppm), chloride, and phosphate (50–500 ppm). Phossy water originates from four main points in the electric furnace process: phosphorus condensers; the phosphorus storage area; phosphorus sludge handling; and furnace scrubber blowdown water. Usually the water collected from all sources are combined, recycled, and treated to remove dissolved or colloidal phosphorus and other heavy metal contaminants. However, as impurities build up in the system a bleed is necessary to control the impurity level. The impurities consist principally of colloidal phosphorus particles (1000–3000 ppm), soluble fluoride (100–1000 ppm), and phosphate (50–500 ppm), scrubbed out of the gas stream in the condenser. Typically for each ton of $P_4$ produced, about 2500–5000 gallons of waste water is generated. Since the waste water contains a small amount of dissolved or suspended particulate phosphorus, it cannot be disposed to the environment without being properly treated.

The oxidation of elemental phosphorus in aerated water under mild agitation conditions is known to be slow. Bullock and Newlands, *Decomposition of Phosphorus in Water*, Proc. Conf. Poll. Chem. Inst. Can., Halifax, N. S., Aug. 24–26, 1969, pp. 23–4, reported that at 50–100 mg/l $P_4$, the half life of phosphorus was 80 hours at 30° C. According to Spanggord et al., *Environmental Fate of White Phosphorus/Felt and Red Phosphorus/Butyl Rubber Military Screening Smokes, Final Report*, SRI International, Contract No. DaMD 17-82-C-2320.AD-a176922 (1985), it took a half life of 2.43 years for a 1 $cm^3$ white phosphorus chunk to disappear by aerated water. The slow oxidation of $P_4$ under these conditions appears to be due to slow diffusion, limited solubility of oxygen, and the formation of protective layers of reaction products on the phosphate surface. Sullivan et al., *A Summary and Evaluation of Aquatic Environmental Data—Part 3, White Phosphorus, Final Report*, Water and Air Research, Inc., Gainesville, Fla., April 1979, suggested a stepwise reaction leading to the formation of several oxides which are ultimately converted to $H_3PO_4$, some intermediate oxyphosphorus compounds such as $H_3PO_3$ and $H_3PO_2$ which are ultimately converted to phosphoric acid $H_3PO_4$ as shown by the following equations:

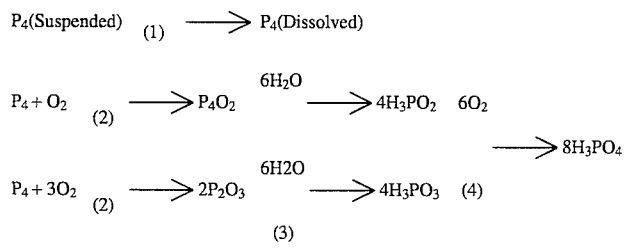

Where (1) = Diffusion-controlled pathway. Rate is dependent on particle size, agitation intensity and other factors.
(2) = First order kinetics; k (base e) = 0.1–0.7/h for disappearance of P4 in distilled water.
(3) = Very rapid hydrolysis to oxyacids.
(4) = Slow oxidation to phosphate.

The above reactions may explain the relatively slow oxidation rates observed with the prior art, specifically a DFC reactor.

The vapor phase oxidation of white phosphorus has been extensively studied by N. Semenoff, *Chemical Kinetics and Chain Reactions*, p. 163–169 (Clarendon Press, Oxford 1935) who derived the theory of branching-chain reactions. According to this, there exists an upper and lower critical pressures of oxygen. The critical pressure of phosphorus occurs between these two critical pressures. However, outside this range of oxygen pressure, the reaction is very slow and limited. The upper critical pressure of oxygen, $^PO_2^U$, is directly proportional to the pressure of phosphorus vapor, and is temperature dependant. On the other hand, the lower critical pressure, $^PO_2^L$, is inversely proportional to the pressure of phosphorus $P_{P4}$, and the square of the diameter of the containing vessel.

The high speed air dispersion reactor, HSAD reactor, is specifically designed to effect a fast and complete oxidation reaction between dissolved or suspended elemental phosphorus ($P_4$) pollutants in an aqueous medium and a finely divided stream of oxygen-containing gas, preferably air. The high agitation speeds results in a well-dispersed gas-sludge mixture or emulsion, resulting in complete oxidation of the $P_4$. The fast oxidation achieved results in a lower percentage of $PO_4^{-3}$ species and a higher percentage of $PO_3^{-1}$ species in the resultant oxidation product.

FIG. 1 discloses the design of HSAD reactor 10. The reactor 10 is a deep column reactor consisting of two sections 16, 18 connected together with flanges 12 and rubber O-rings 14. The first or lower section 16 comprises a high shear/high intensity agitation and air dispersion zone, referred to as the dispersion zone 17, at the bottom of the reactor 10. The second or upper section 18 comprises a low shear bubble hold up and mixing zone, referred to as the mixing zone 19, mounted at the top of the reactor 10. The reactor 10 used to carry out the Examples disclosed below is fabricated using ¼ inch thick Plexiglas tube, having approximately a 3 inch inside diameter and approximately a 30 inch height. However, this is a general configuration and the reactor 10 may be constructed from any suitable materials and in any suitable dimensions for the treatment of various contaminated materials. Those of ordinary skill in the fluids arts would be able to scale the reactor 10 and to choose the appropriate constructive materials without undue experimentation.

The lower section 16 further comprises an agitation means 20 capable of high speed and high shear mixing. Bladed propellers are preferred, and the agitation means 20 used in the reactor 10 to carry out the Examples is a 4-blade propeller agitator 20 driven at the bottom by a motor 22, preferably series-wound, fan cooled and with a permanently lubricated bearing. The motor 22 preferably has a speed range from 4,000 to 21,000 rpm. Air or another oxygen-containing gas 24 is injected through a sparger 26 directed toward the agitation means 20. The gas 24 stream is instantly subdivided by the agitation means 20 into micron-sized dispersed bubbles 28 which are intimately mixed with the $P_4$-containing material 30 in the zone 17. The temperature of the reactor 10 is measured by a thermocouple 32. Samples of the material 30 may be drawn from the drainage port 34. As an alternative, this lower section 16 of the reactor 10 can be designed to stand alone and to be connected externally to the upper section 18 of the reactor 10. The high shear agitation also may be achieved by a high speed blender type agitator or a high shear pump.

The dispersion zone 17 ensures favorable conditions during the contact of air bubbles 28 with the $P_4$ pollutants in the material 30, including: (a) in situ generation and dispersion of micron size air bubbles 28 which result in high liquid/gas surface area; (b) provide enough kinetic and/or thermal energy to initiate and sustain a fast air-oxidation reaction; (c) generation of fresh and large $P_4$ surfaces by emulsification of the $P_4$-particles to micron size $P_4$-emulsion in water; (d) increase the partial vapor pressure of $P_4$ in the oxygen rich air cavities (bubbles); (e) enhance $O_2$ mass transfer or dissolution of oxygen in the aqueous phase; and (f) produce in situ oxygen free radical and/or ozone in the reaction zone.

The upper section 18 preferably is a well-baffled cylindrical tube with air feed 24, phosphorus-containing material feed 36, wash water injection ports 38, and an off gas outlet 40. A pH electrode 42 and thermocouple 44 sensors are inserted in the upper section 18 of column reactor 10 to measure the in situ pH and temperature of the reaction between the $P_4$ and the oxygen contained in the air or other oxygen-containing gas, more fully described below. This upper section 18 of the reactor 10 is designed to ensure uniform and gentle mixing of the $P_4$-containing material 30 and to serve as a froth column hold up region for increasing the contact time and solubility of the gaseous oxyphosphorus products, for example $P_2O_5$ and $P_2O_3$, in the aqueous phase. The unreacted and/or undissolved gases are passed through a water condenser (not shown) and then a gas bubbles scrubber (not shown) containing a strongly alkaline solution, preferably KOH or NaOH, to scrub any acidic fumes from the off gas stream 40.

Figure 2:
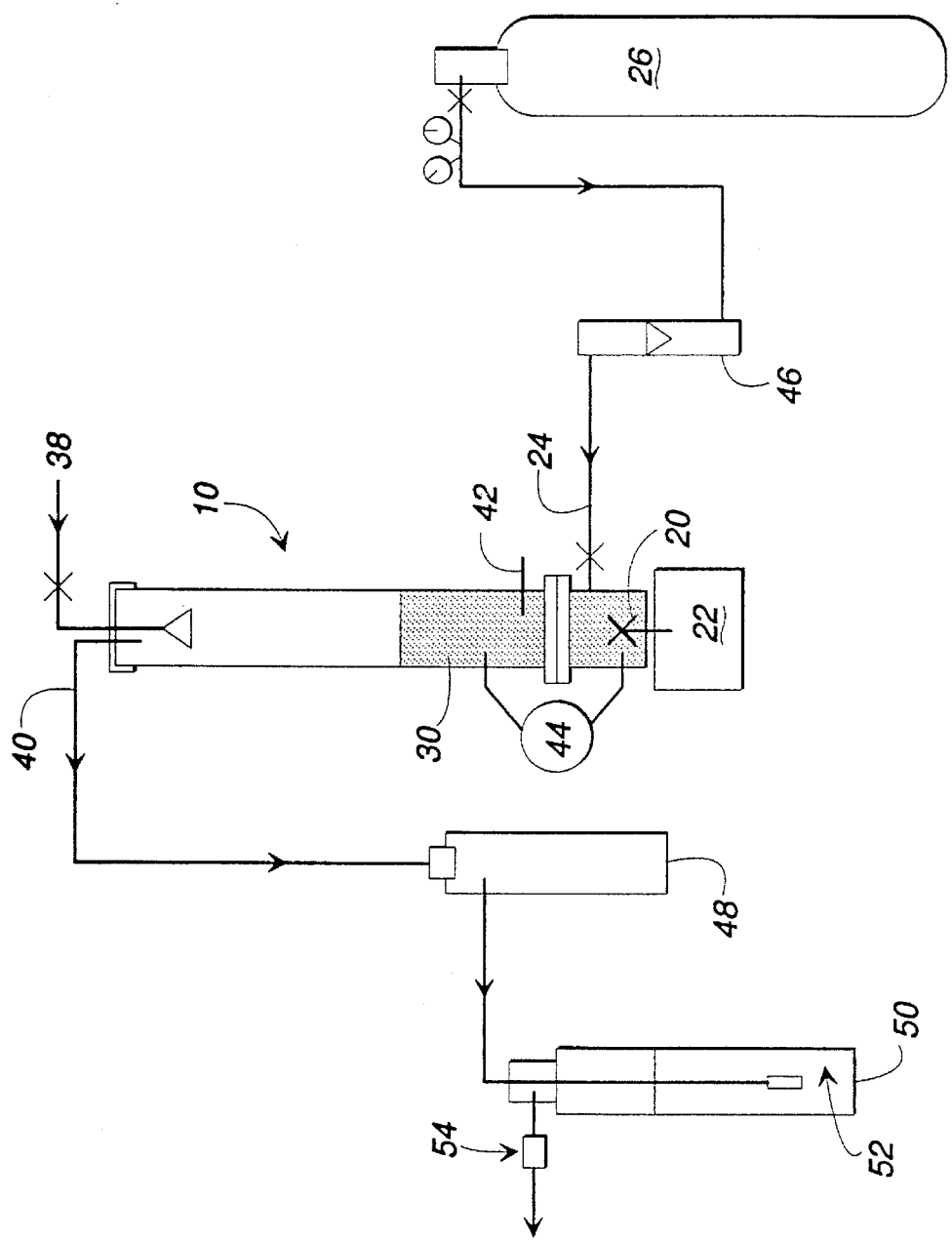
FIG. 2 is a schematic diagram of the HSAD reactor shown in FIG. 1 as a component of a phosphorous-containing waste treatment operation.

FIG. 2 shows a schematic diagram which discloses the experimental set up used for treatment of phosphorus-containing sludge samples. Unless otherwise stated, the following procedure is used as a basis throughout the experiments mentioned under Examples. Aqueous, phosphorus-containing sludges are used as the phosphorus-containing material in the Examples. However, other phosphorus-containing materials also can be treated in the reactor 10 and by the disclosed process. All component percentages are given in weight percent.

A phosphorus-containing sludge sample 30 is introduced to the lower section 16 of the reactor 10, specifically the dispersion zone 17. The sludge 30 is diluted to about one liter using water resulting in a sludge:water ratio of between about 1:4 and 1:6, and having approximately 26 g $P_4$. The initial sludge is supplied to the process and apparatus at a temperature of between 20° C. (ambient) and 60° C., and preferably adjusted to between about 42° C. and 44° C. (the melting temperature of phosphorus) during the dilution step. The dilute sludge 30 is homoginized at a relatively low initial rotor speed, preferably in the range of 2,000–4,000 rpm, in part to avoid air entrapment, for several minutes prior to air injection to allow the taking of an initial sludge sample. Air or another $O_2$-containing gas mixture 24 then is introduced to the reactor 10 through a flowmeter 46 at constant flow rate and is injected into the sludge 30. The sludge 30 is agitated at a constant agitation speed while the gas mixture 24 is being injected. The gas mixture 24 flow rate is primarily dependent on the predetermined $P_4$ content of the sludge 30. The $P_4$ content can be determined by any of the known processes, such as toluene extraction gas chromatography. Gas mixtures 24 having oxygen concentrations higher than air (about 20% $O_2$) may be required for treatment of concentrated sludge 30. The gas mixture 24 can be introduced to the sludge 30 as micron and sub-micron sized microbubbles 28, or can be made into such microbubbles 28 by the agitation means 20.

After injecting the $O_2$-containing gas mixture 24, the sludge 30 is agitated at a high speed, preferably in the range of 3,000–20,000 rpm, which is maintained constant throughout the process. The high speed agitation emulsifies the gas 24/sludge 30 mixture. The agitation means 20 may require occasional adjustments during the process due to changes in the pulp temperature and viscosity which occur as the oxidation reaction progresses. The agitation speed is monitored with an optical tachometer (not shown). During treatment, in situ measurements of the pulp temperature, pH, and $O_2$ content of the off gas 40 are made at regular time intervals until completion of the oxidation reaction. For analysis, samples of about 10 ml can be taken from the bottom of the reactor 10. The actual temperature and pH of each sample taken can be measured and recorded. The progress of the reaction can be monitored from the rapid rise in the temperature and the decrease in the pH of the treated sludge. The off gas 40 stream passes through a float trap 48 to collect any froth or water mist, and then the acidic fumes are captured in a scrubber 50 containing a strong alkaline solution 52.

The oxidation reaction is considered complete when the evolution of white fumes in the off gas 40 outlet ceases and when the sludge 30 temperature declines. Thereafter, agitation and aeration are continued for approximately 30 to 60 minutes to ensure completion or termination of the oxidation reaction. The oxygen consumption can be monitored by an oxygen analyzer 54. The treated sludge 30 is filtered or centrifuged to separate any solid residue in the aqueous supernatent solution. The supernatent solution and solid residue are then analyzed for elemental phosphorus, $PO_4$, $PO_3$, $SO_4$, F and Cl ions. A portion of the supernatent solution can be neutralized with NaOH to investigate the feasibility of heavy metal removal.

In order that the process of the invention can be better understood, and how the invention can be practiced, the following Examples are given as illustrations of the process for the treatment of phosphorous sludges and phossy water and are not intended to be limitations. All component percentages are percent by weight.

EXAMPLE 1

Two tests were conducted on an electric furnace sludge sample obtained from the FMC Corporation in Pocatello, Id. The sludge sample was collected from a settling pond which probably contained a mixture of phosphorus sludge, fly ash, and bottom ash. The as-received sludge sample was screened at 48 mesh (300 microns) to separate the oversize trash material. The minus 48 mesh material, representing about 98% by weight of the sample, was mixed thoroughly and split into representative samples averaging about 14.0% $P_4$, 26.4% non-$P_4$ solids, and 59.6% water.

In Test No. 1, the HSAD reactor described above was used to treat one liter of the FMC sludge containing about 26 grams $P_4$ and about 7.5% total solids (in the pulp). The sludge had an initial pH of about 6.0 and a temperature of about 66° F. The sample was agitated at an impeller speed of 8,000 rpm and oxidized using air at a flow rate of 2 SLPM (standard liter per minute). As agitation/aeration proceeded, the pulp temperature rose steadily from about 19° C. to reach a limiting value of about 70° C. after 60 minutes; then the temperature declined to about 49° C. after 100 minutes treatment. During the reaction, the pulp pH decreased continuously from about 6.0 to reach a limiting value of about 1.56 at the end of the test.

Table 1A shows the results of chemical analyses of the oxidation reaction products (supernatent solution) as a function of time. The data shows that the primary oxidation products of phosphorous detected in the supernatent solution are the $PO_4$ and $PO_3$ acidic species. These species are primarily responsible for the observed decrease in the pulp pH from about 6.0 to about 1.56. The data also shows that the $P_4$ oxidation reaction is fast and exothermic as indicated by the rapid rise of the pulp temperature which exceeds by far any rise in temperature that can be attributed solely to agitation. The fast exothermic reaction continued in this test for about 60 minutes. Longer agitation results in a decline in the pulp temperature indicating termination of the fast exothermic oxidation reaction. The termination of the fast reaction is accompanied by an incremental increase of $PO_4$ concentration and a decrease in the intensity of the white fumes of oxyphosphorus compounds which subsequently ceases or stops completely at the end of the experiment. Thus, the cessation of white fumes and the decline of the pulp temperature are good indicators for the completion of $P_4$ conversion to oxyphosphorus compounds.

The off-gas scrubber solution analyzed about 3.0 gm/l $PO_4$ and 1.8 gm/l $PO_3$. This corresponds to about 6.5% of the total $P_4$ in the system. More important, however, is the fact that the scrubber solution and the supernatent acidic solution contained only 4 ppb elemental phosphorus. On the other hand, the suspended solids in the supernatent solution or treated sludge residue contain about 180 ppm $P_4$ apparently encapsulated or absorbed on the clay particles. The accounted-for $P_4$ in the treated sludge of 27.55 gm/l is slightly higher than the original $P_4$ input of 26 gm/L because of the dissolution of some of the solid phosphate particles in the strongly acidic supernatent solution product. In general, the total phosphorus conversion to oxycompounds approaches 100% after 120 minutes treatment.

TABLE 1A

HSAD Wet Oxidation Treatment of FMC Sludge

| Treatment Time, min | Sludge Temp C.° | pH | Sludge Analysis, gm/l PO$_4$ | PO$_3$* | P$_4$* | P$_4$ Conversion Rate mg/min | % |
|---|---|---|---|---|---|---|---|
| 0 | 19 | 6.0 | 0.89 | — | 26.00 | 0 | 0 |
| 10 | 28 | 4.46 | 3.30 | — | 24.67 | 88.7 | 5.1 |
| 30 | 38 | 3.05 | 9.06 | — | 21.48 | 150.7 | 17.4 |
| 60 | 64 | 1.95 | 23.88 | — | 12.72 | 295.1 | 51.1 |
| 120 | 70 | 1.71 | 38.17 | — | 5.38 | 343.7 | 79.3 |
| 180 | 65 | 1.63 | 44.71 | — | 0.0 | 324.0 | 93.5 |
| 270 | 56 | 1.61 | 44.51 | — | 0.0 | 285.9 | 93.5 |
| 360 | 49 | 1.56 | 44.71 | 25.37* | 0.0 | 243.0 | 93.5 |
| Off-Gas Scrubber | | | 3.12 | 1.77* | 0.0 | — | 6.5 |
| Composite Treated Slude | | | 47.83 | 27.14 | 26.00 | 260 | 100.00 |
| Analyzed Treated Sludge (after 9 months) | | | 56.42 | 19.56 | 27.55** | | 100.00 |

*Calculated based on 26 gm $P_4$ per liter of sludge and complete oxidation.
**Excess $P_4$ material balance is due to dissolution of insol $PO_4$ compounds in the highly acidic treated sludge In Test No. 2, a parallel oxidation test was made, using a modified Denver flotation cell (DFC) as a reactor and aerator. One liter of the same FMC sludge mentioned earlier (containing about 26 gm $P_4$ and about 7.5% total solids) was treated. The initial pulp temperature was about 19° C., and the pH was about 5.5. The sludge was agitated at an impeller speed of 1,000 rpm and an air flowrate of 2 SLPM was used. Results of the DFC reactor test are given in Table 1B. In this test, the data show that after 6 hours agitation/aeration in the DFC reactor, only 40.7% of the phosphorus was essentially converted to $PO_4$ and $PO_3$. Under the test conditions, the rate of oxidation reaction in the DFC reactor is slow, 21.3 mg/min, compared to an average rate of 260 mg/min observed with the HSAD reactor. This means that the HSAD reactor is about 12 times faster than the mildly agitated (1,000 rpm) DFC reactor which may require more than 21 hours to complete the oxidation. As a result, the DFC treated sludge residue contains very high toxic levels of $P_4$, 15% (dry basis), and therefore cannot be disposed of safely. The above results demonstrate the superior performance of the HSAD reactor over the current state of the art.

TABLE 1B

Conventional Wet Oxidation (DFC Reactor) Treatment of FMC Sludge

| Treatment Time, min | Sludge Temp C.° | pH | Analysis, gm/l PO$_4$ | PO$_3$* | P$_4$* | P$_4$ Conversion Rate mg/min | % |
|---|---|---|---|---|---|---|---|
| 0 | 19 | 5.5 | 1.40 | — | 26.00 | 0 | 0 |
| 10 | — | 4.1 | 1.70 | — | 25.80 | 16.6 | 0.6 |
| 30 | — | 3.8 | 2.36 | — | 25.47 | 17.7 | 2.0 |
| 60 | — | 3.4 | 3.43 | — | 24.88 | 18.7 | 4.3 |
| 120 | — | 3.0 | 6.28 | — | 23.30 | 22.5 | 10.4 |
| 180 | — | 2.7 | 8.71 | — | 21.96 | 22.5 | 15.6 |

TABLE 1B-continued

Conventional Wet Oxidation (DFC Reactor) Treatment of FMC Sludge

| Treatment Time, min | Sludge Temp C.° | pH | Analysis, gm/l $PO_4$ | $PO_3$* | $P_4$* | $P_4$ Conversion Rate mg/min | % |
|---|---|---|---|---|---|---|---|
| 270 | — | 2.5 | 13.91 | — | 19.08 | 25.6 | 26.6 |
| 360 | 54 | 2.4 | 17.94 | 9.15 | 16.85 | 25.4 | 35.2 |
| Off-Gas Scrubber | | | 2.10 | 1.16 | (1.44) | — | 4.5 |
| Composite Treated Sludge | | | 20.04 | 10.31 | 15.41 | 21.3 | 40.7 |

*Calculated based on 26 gm $P_4$ per liter of sludge and complete oxidation.

The 10 times faster oxidation rates reported for the HSAD reactor is attributable to the initiation of a series of exothermic chain reactions between the finely divided $P_4$-emulsion after reaching a critical temperature of 42° C. which is very close to the melting point of $P_4$. Also the micron size air/oxygen bubbles generated in the HSAD reactor and the high speed agitation likely increase the partial pressures of $P_4$ vapor and $O_2$ in the agitation cavity around the impeller. Following are the reactions which occur in the oxidation of $P_4$ by $O_2$ to $H_3PO_4$:

$$P_4 + O = P_4 + O \quad +130 \text{ Kcal} \quad (1)$$
$$P_4 + O = P_4O \quad +130 \text{ Kcal} \quad (2)$$
$$O + O_2 + M = O_3 + M \quad (3)$$
$$P_4O = PO + P_3 \quad -69 \text{ Kcal} \quad (4)$$
$$P_3 + O = PO + P_2 \quad +20 \text{ Kcal} \quad (5)$$
$$P_3 = P_2 + P \quad -100 \text{ Kcal} \quad (6)$$
$$P + O_2 = PO + O \quad +5 \text{ Kcal} \quad (7)$$
$$M + P + O = PO + M \quad +123 \text{ Kcal} \quad (8)$$
$$M + PO + O = PO_2 + M \quad +120 \text{ Kcal} \quad (9)$$
$$2(PO + PO_2) = P_4O_6 \quad \xrightarrow{6H_2O} 4H_3PO_3 \quad (10)$$
$$P_4O_6 + O_2 = P_4O_7 + O \quad (11)$$
$$P_4O_7 + O = P_4O_8 \quad (12)$$
$$P_4O_8 + O_2 = P_4O_9 + O \quad (13)$$
$$P_4O_9 + O = P_4O_{10} \quad \xrightarrow{6H_2O} 4H_3PO_4 \quad (14)$$

Possible Termination Reactions $$O + \text{Wall} \quad (15)$$
$$O + O_2 + M = O_3 + M \quad (16)$$
$$O + O + M = O_2 + M \quad (17)$$

EXAMPLE 2

Three tests were conducted on a sludge sample provided by the Tennessee Valley Authority, Muscle Shoals, Ala. The sample was taken from a railroad storage car representing sludge produced during previous $P_4$ operations from 1934–1976. The as-received sample was wet screened at 48 mesh sieve to remove the trash oversize material of about 2%. The minus 48 mesh material containing 27.7% $P_4$ (dry basis) was diluted to 4% and 6% solids for Tests Nos. 3 and 4, respectively. The sample used in Test No. 5 represented the minus 325 mesh size fraction of the as-received sludge (73.7%) and contained 6% solids with 5% $P_4$ (dry basis). In each test, one liter of the dilute sludge was treated in the HSAD reactor at room temperature of about 66° F. (19° C.), 0.9 SLPM air, and an impeller speed of about 8,000 rpm.

In Tests Nos. 3 and 4, sludge treatment was completed without interruption of agitation, while in Test No. 5 agitation was interrupted. Results of these treatment are given Table 2. The data show that a complete oxidation was achieved in both Tests Nos. 3 and 4 for the minus 48 mesh and the minus 325 mesh fines respectively. In Test No. 3, the fast oxidation reaction was terminated when the white fumes ceased, indicating essential completion of the reaction, after 36 minutes, while 75 minutes was required for Test No. 4. This corresponds to a rate of $P_4$ oxidation of 77 and 98 mg/min and $P_4$ conversion of about 93% and 66% respectively. The balance of the $P_4$ was considered to be essentially convened to $PO_3$ compounds as confirmed by gas chromatography where only about 4 ppb $P_4$ was detected in the treated sludge.

The results obtained for Test No. 5 reflect some initial difficulties encountered during agitation. For example, the rate of $P_4$ conversion during the first 60 minutes averaged only 38.6 mg/min compared to 77–98 mg/min for Tests Nos. 3 and 4. Further, as agitation stopped completely, after 2 hours, and aeration continued for an additional 5 hours, the rate of $P_4$ oxidation dropped to 6 mg/min. It should be noted that during the duration of aeration treatment, the evolution of white oxyphosphorus fumes continued, indicating incomplete $P_4$ oxidation. Finally, when agitation resumed on the same sludge at constant 8,000 rpm, the rate of $P_4$ oxidation to $PO_4$ increased sharply to about 94 mg/min. The value is comparable to 98 mg/min observed in Test No. 4. The fast oxidation reaction was terminated after 57 minutes and the final treated sludge plus the scrubber solution analyzed a total of 32.6 gm/l $PO_4$. This represented about 64% conversion of $P_4$ to $PO_4$. The balance of the $P_4$ was assumed to be converted to $PO_3$ compounds. The results of Test No. 5 indicate that the high speed agitation is essential for achieving fast $P_4$ oxidation and complete sludge treatment by the HSAD reactor. Further, all tests presented in this Example clearly demonstrate the applicability of the HSAD technique in treating sludges of different origin, particle size consist, percent solids, and $P_4$ content.

TABLE 2

Results of HSAD Treatment of TVA Sludge

| Test # | Initial Sludge Solids % | $P_4$, gm | Treatment Time, min. FOR-Termn. | Total | Final Conc. gm/l $PO_4$ | $PO_3$* | $P_4$ Conversion Rate mg/min | $PO_4$ % |
|---|---|---|---|---|---|---|---|---|
| 3 | 6.0 | 3.0 | 36 | 180 | 8.5 | 0.56 | 77 | 92.6 |
| 4 | 4.0 | 11.1 | 75 | 180 | 22.5 | 9.5 | 98 | 66.4 |
| 5 | 6.0 | 16.6 | 142** | 441 | 8.6 | — | 38.6 | 16.7 |
| 5*** | — | — | 57 | 77 | 32.6 | 15.1 | 94 | 64.3 |

*Calculated values based on 100% conversation of $P_4$ to oxyphosporus compounds TABLE 2-continued Results of HSAD Treatment of TVA Sludge

| Test # | Initial Sludge | | Treatment Time, min. | | Final Conc. gm/l | | $P_4$ Conversion | |
|---|---|---|---|---|---|---|---|---|
| | Solids % | $P_4$, gm | FOR-Termn. | Total | $PO_4$ | $PO_3$* | Rate mg/min | $PO_4$ % |

**Agitation not constant and finally stopped
***Agitation resumed at 8,000 rpm

As expected, the rate of $P_4$ oxidation may vary from one sludge to the other because of the variations in the sludge composition and associated constituents (such as fly and bottom ash, lime or other organic matter). In fact, the FMC sample tested in Example 1 (from current operations), gave a faster rate of oxidation than the TVA samples representing a sludge stored for over 20 years.

EXAMPLE 3

Three tests were conducted on one liter $P_4$ suspensions containing 2.6, 10, and 20 grams of chemical grade elemental phosphorus using the HSAD method to remove the suspended $P_4$ particles. The tests were performed using 2 SLPM air flowrate at an impeller speed of 8,000 rpm and an initial sludge temperature of about 42° C. Results of these tests are given in Table 3. In all tests, complete $P_4$ oxidation was achieved as indicated by the cessation of white fumes at the termination of the fast oxidation reaction after which all suspended $P_4$ particles dissolved completely and a clear solution was obtained. This was confirmed by $P_4$ gas chromatographic analysis which showed no detectable $P_4$ in the clear solution obtained after HSAD treatment.

TABLE 3

Oxidation Treatment of Chemical Grade $P_4$ Suspensions

| Test # | Initial Sludge | | Treatment Time, min. | | Final Conc. gm/l | | $P_4$ Conversion | |
|---|---|---|---|---|---|---|---|---|
| | Solids % | $P_4$, gm | FOR-Termn. | Total | $PO_4$ | $PO_3$* | Rate mg/min | $PO_4$ % |
| 6 | 0.26 | 2.6 | 15 | 60 | 5.09 | 2.38 | 117 | 64.0 |
| 7 | 1.00 | 10.0 | 35 | 85 | 22.02 | 7.13 | 198 | 72.0 |
| 8 | 2.00 | 20.0 | 52 | 180 | 35.98 | 20.98 | 195 | 58.8 |

*Calculated values based on 100% conversion of $P_4$ to oxyphosphorus compounds

The data in Table 3 shows that the fast oxidation reaction termination time is generally proportional to the $P_4$-content of the suspension. Under the test conditions, the rate of $P_4$ oxidation ranged from 116 to 198 mg/min with the lower value obtained at low percent solids of 0.26%. The corresponding $P_4$ conversion to $PO_4$ ranged from about 59% to 72% with the balance being essentially converted to $PO_3$.

The results obtained demonstrated that the applicability of the HSAD technique in treating chemical grade $P_4$-suspensions with relatively high and low phosphorus content. The treated $P_4$-suspensions are clear and devoid of colloidal phosphorus particles. The final $PO_4$ concentrations are largely dependent on the operating conditions and the time allowed for the slow $PO_3$ conversion to $PO_4$. The data also suggests that treatment of $P_4$-contaminated waters phossy water can be treated by the HSAD technique. On the other hand, the same technique can be used with slight modification, such as but not limited to changing the oxygen content of the gas or the solids content of the sludge, as alternative technology for the production of food-grade phosphoric acid and chemicals.

EXAMPLE 4

Two tests were conducted on the minus 48 mesh FMC sludge in which samples containing about 24 gm $P_4$ each were treated in the HSAD reactor at 7.5% solids, 2 SLPM air and an impeller speed of 8,000 rpm. In Test No. 9 the pH of the sludge was the natural pH of 6.0, while Test No. 10 was conducted on a sludge adjusted to pH 2.4 using a supernatent solution produced from Test No. 9 (the recycled oxyphosphorus acid solution). Results of these tests are presented in Table 4. The data shows that regardless of the initial pH of the sludge, a complete phosphorus conversion is achieved. The $PO_4$ conversion in each case was about 63± 1% (which is within experimental error) and the rates of $P_4$ oxidation are comparable. These results imply that a continuous treatment of the sludge and the recycling of dilute supernatent solutions to produce a more concentrated fertilizer by-product(s) is feasible.

TABLE 4

Oxidation Treatment of Chemical Grade $P_4$ Suspensions

| Test # | Initial Sludge | | Treatment Time, min. | | $PO_4$ Conc. gm/l | | $P_4$ Conversion | |
|---|---|---|---|---|---|---|---|---|
| | pH | $P_4O$, gm | FOR-Termn. | Total | Final | Net | Rate mg/min | $PO_4$ %* |
| 9 | 6.0 | 0.89 | 75 | 100 | 47.73 | 46.84 | 204 | 63.8 |
| 10 | 2.4 | 21.50 | 70 | 115 | 67.09 | 45.59 | 213 | 62.1 |

*The balance of 100% $P_4$ conversion is essentially in the form of $PO_3$

EXAMPLE 5

To demonstrate the effect of oxygen content of the dispersed gas used for $P_4$ oxidation, three FMC sludge samples (one liter of the minus 48 mesh fraction), each containing 26.0 gm $P_4$ and total solids of 75 gm/l, were treated by the HSAD technique using three different $O_2/N_2$ mixtures of 20%, 50% and 80% $O_2$ by volume. The tests were conducted at a constant gas mixture flow rate of 2 SLPM, an initial sludge temperature of 42° C., and an agitator/impeller speed of 8,000 rpm. Results of these tests are given in Table 5. The data shows that increasing the oxygen concentration in the dispersed gas from 20 to 80% not only enhances the fast oxidation reaction rate from 362 to 714 mg $P_4$ per minute (that is, reduces the fast oxidation reaction termination time to about half), but also increases the $P_4$ conversion to $PO_4$ from 63% to about 69%. Thus, $O_2$-enriched air can be used as dispersed gas for the purpose of enhancing the $P_4$-oxidation particularly in the early stages of treatment. This technique provides a useful tool for overall control of the HSAD process in terms of the rate of pulp temperature rise due to the heat evolved from the exothermic fast oxidation reaction.

As mentioned in Example 1, a critical pulp temperature of about 42° C. is required to initiate the fast oxidation reaction. Accordingly, in a continuous treatment process the critical temperature can be achieved by mixing a part of the hot treated sludge with cool non-treated sludge feed prior to injection in the HSAD reactor and no external heating source is required.

indicate that the three variables tested, i.e., initial sludge temperature, impeller speed (agitation intensity), and dispersed gas composition, have pronounced effects on the $PO_4/PO_3$ conversion ratios in the treated sludge and the residual $P_4$ in the solid and solution phases of the sludge. The highest $PO_4/PO_3$ conversion ratio of about 4 (i.e. 80% $PO_4$ conversion) was reached at 4,000 rpm and 80% $O_2$. At higher impeller speeds and lower $O_2$ contents in the dispersed gas, the $PO_4/PO_3$ ratios declined to about 1.1 (i.e. 52% $PO_4$ conversion). The residual $P_4$ in the solid phase of the sludge was generally low and ranged from 5–263 ppm. The supernatent solution phase of the treated sludge showed much lower levels of residual $P_4$ and averaged about 4 ppb.

TABLE 5

Effect of $O_2$ Content on FMC Sludge Treatment of 42° C.

| | Dispersed gas | | | Product $PO_4$ | | $P_4$ Conversion | |
|---|---|---|---|---|---|---|---|
| Exp # | $O_2$ Content, Vol. % | Treatment Time, min. FOR-Termn. | Total | Conc, gm/l | $P_4$ equiv. | Rate mg/min | $PO_4$ %* |
| 11 | 20 | 45 | 70 | 50.23 | 16.43 | 365 | 63.0 |
| 12 | 50 | 35 | 60 | 52.51 | 17.17 | 491 | 66.0 |
| 13 | 80 | 25 | 62 | 54.60 | 17.85 | 714 | 68.6 |

*The balance of 100% $P_4$ conversion is expected to occur as $PO_3$

EXAMPLE 6

A series of nine tests were conducted on one liter samples of the minus 48 mesh FMC sludge containing approximately 26.0 gm $P_4$ and 75 gm/l solids (7.5% solids) at a constant dispersed gas flow rate of 2 SLPM and a variable initial sludge temperature, impeller speed, and gas composition. Results of these tests are given in Table 6. The data presented

TABLE 6

Effect on Operating Conditions of the Quality

| Test # | Initial Temp. °C. | Oxygen % Vol | Impeller Speed RMP | $P_4$ Conversion, gm/L | | $PO_4/PO_3$ Ratio | $P_4$ Conversion % | Residual $P_4$ | |
|---|---|---|---|---|---|---|---|---|---|
| | | | | $PO_4$ | $PO_3$ | | | Solid, ppm | Sol'n, ppb |
| 14 | 20 | 20 | 4,000 | 61.8 | 29.8 | 1.72 | 122.4 | 132 | ND |
| 15 | 42 | 50 | 4,000 | 66.8 | ND | 2.39* | 119.1* | 37 | 4.9 |
| 16 | 20 | 80 | 4,000 | 70.3 | 14.7 | 3.98 | 110.4 | 5 | 3.6 |
| 17 | 64 | 80 | 4,000 | 72.2 | 20.2 | 2.97 | 121.1 | 166 | 3.7 |
| 18 | 42 | 20 | 8,000 | 48.5 | 36.7 | 1.10 | 116.3 | 238 | 4.2 |
| 19 | 42 | 50 | 8,000 | 54.1 | 37.9 | 1.19 | 125.1 | 263 | 4.2 |
| 20 | 64 | 50 | 8,000 | 62.3 | ND | 1.92* | 119.1* | 254 | ND |
| 21 | 64 | 20 | 12,000 | 58.4 | 30.5 | 1.60 | 119.3 | 7 | 3.9 |
| 22 | 20 | 80 | 12,000 | 53.3 | ND | 1.29 | 119.1* | 149 | ND |

*Calculation based on average $P_4$ conversion % of 11.91%
ND Not Determined

On the other hand, the oxyphosphorus species accounted for in the treated sludge products of all tests consistently show over 100% $P_4$ conversion with an average of 119.1%

$P_4$ conversion. The reason for the apparent excess $P_4$ conversion of about 20% was found to be due to the dissolution of some solid mineral compounds, such as apatite, originally present in the sludge by the strongly acidic solution generated during HSAD treatment. The non-treated sludge contained about 49 gm of non-phosphorus mineral residue. After treatment, however, the actual solids separated from the treated sludge in all cases ranged from 22–28 gm indicating an average weight loss of about 50%. In fact, the treated sludge residues analyzed 8.0% Ca, 8.3% $PO_4$, and 48.5% acid insolubles compared to 13.5% Ca, 31.6% $PO_4$, and 24.5% acid insolubles for the untreated sludge solids. Further, TCLP tests on the solid residue containing about 215 ppm $P_4$ proved that only 0.85 ppb $P_4$ was leachable, i.e., the balance of the residual $P_4$ in the solid phase was immobile.

The above results clearly demonstrate the high efficiency of the HSAD technique in $P_4$ removal under the test conditions mentioned above. Obviously, further improvements in the process can be achieved by optimization of the above factors and others related to the reactor flow sheet design and mode of operation such as batch or continuous systems, as can be done without undue experimentation by one skilled in the art. Moreover, the new invention is effective in recovering additional amounts of phosphate values from the original non-treated sludge solids. Also, the treatment would result in changes in the classification of this waste from hazardous to non-hazardous. Accordingly, substantial reduction in the disposal costs due to the reduction of the final disposable solids by as much as 50% can be achieved.

PROCESS FOR TREATMENT OF PHOSPHORUS SLUDGE AND SOILS

Based on the results presented under Examples 1 through 6, the unique process of the present invention has been developed for treatment and complete removal of dissolved or suspended $P_4$ contaminants from phosphorous containing sludges and liquids, such as typical electric furnace sludge or phossy water. The process also is applicable to contaminated soils from accidental leakage or spills in $P_4$ dumps, storage tanks, and transportation vehicles, as well as contaminated soils resulting from military use and training with $P_4$-based chemical weapons and smoke screens.

Figure 3:
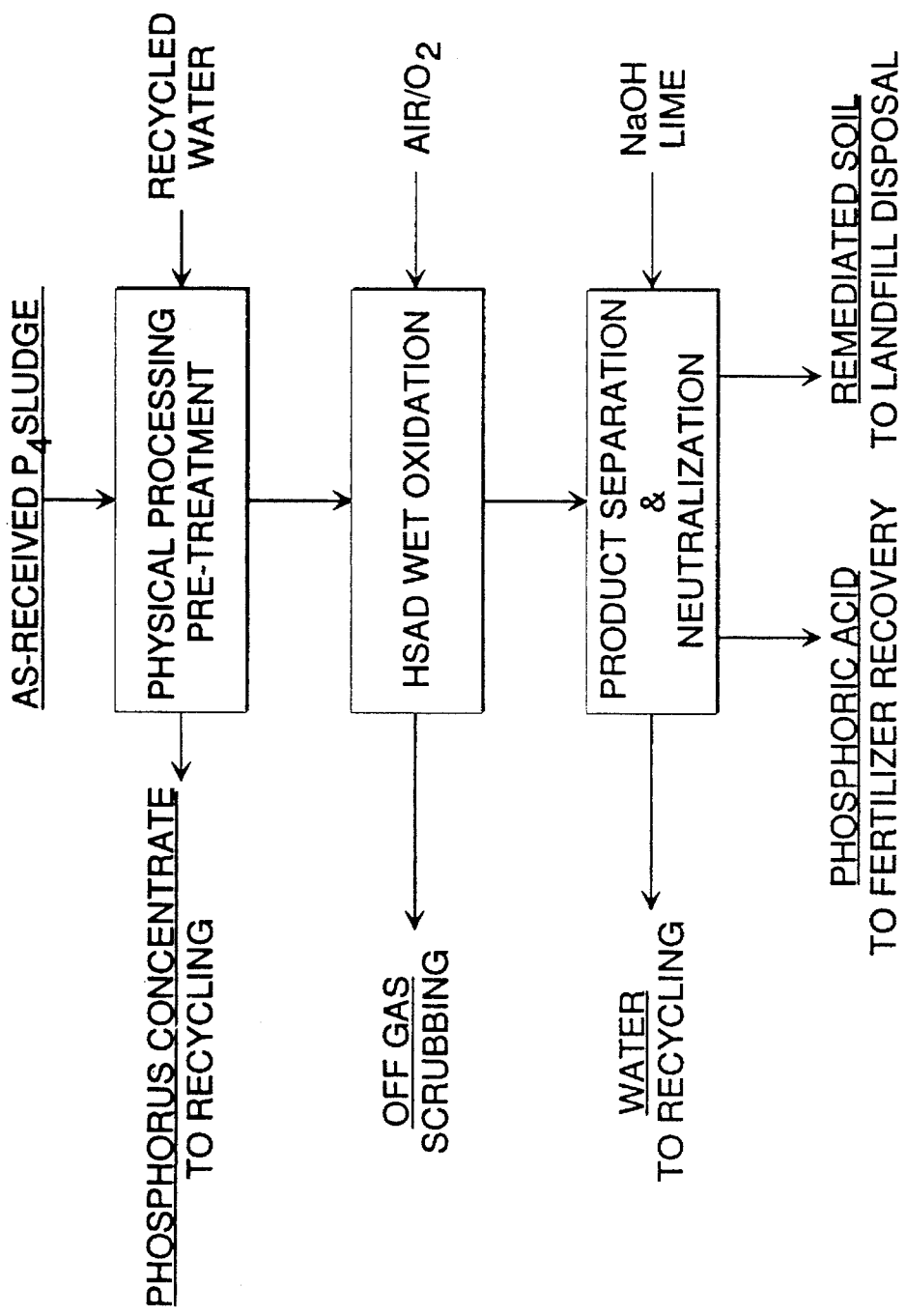
FIG. 3 is a flow chart of the process of the present invention.

FIG. 3 shows a flow chart of the $P_4$-remediation system. The system involves three major steps: first, physical processing pretreatment and recovery of coarse $P_4$ particles 60; second, HSAD wet oxidation treatment 62 of the residual $P_4$ in the fines; and third, processing of downstream products 64. Generally, the technology involved in the first and third steps is well-established; therefore, attention is focused on the addition of the HSAD treatment technology to the process. The objective is to oxidize and convert the highly toxic $P_4$-pollutants to non-hazardous oxyphosphorus compounds that are easy to recover and/or remove from the wastes and to produce environmentally acceptable landfill material or non-hazardous wastes.

For the treatment of low phosphorus sludges containing less than 1% $P_4$ and for soil remediation, the system shown in FIG. 3 can be reduced to two steps: first, the physical pretreatment 60; and second, the HSAD wet oxidation step 62. The treated acidic sludge or soil in the second step can be neutralized by a hydrated lime injected into the mixing zone 19 of the reactor 10. In the case of phosphorus contaminated water or phossy water containing 500 ppm $P_4$ or less, only the above modified second step, HSAD oxidation/neutralization, is required.

Figure 4:
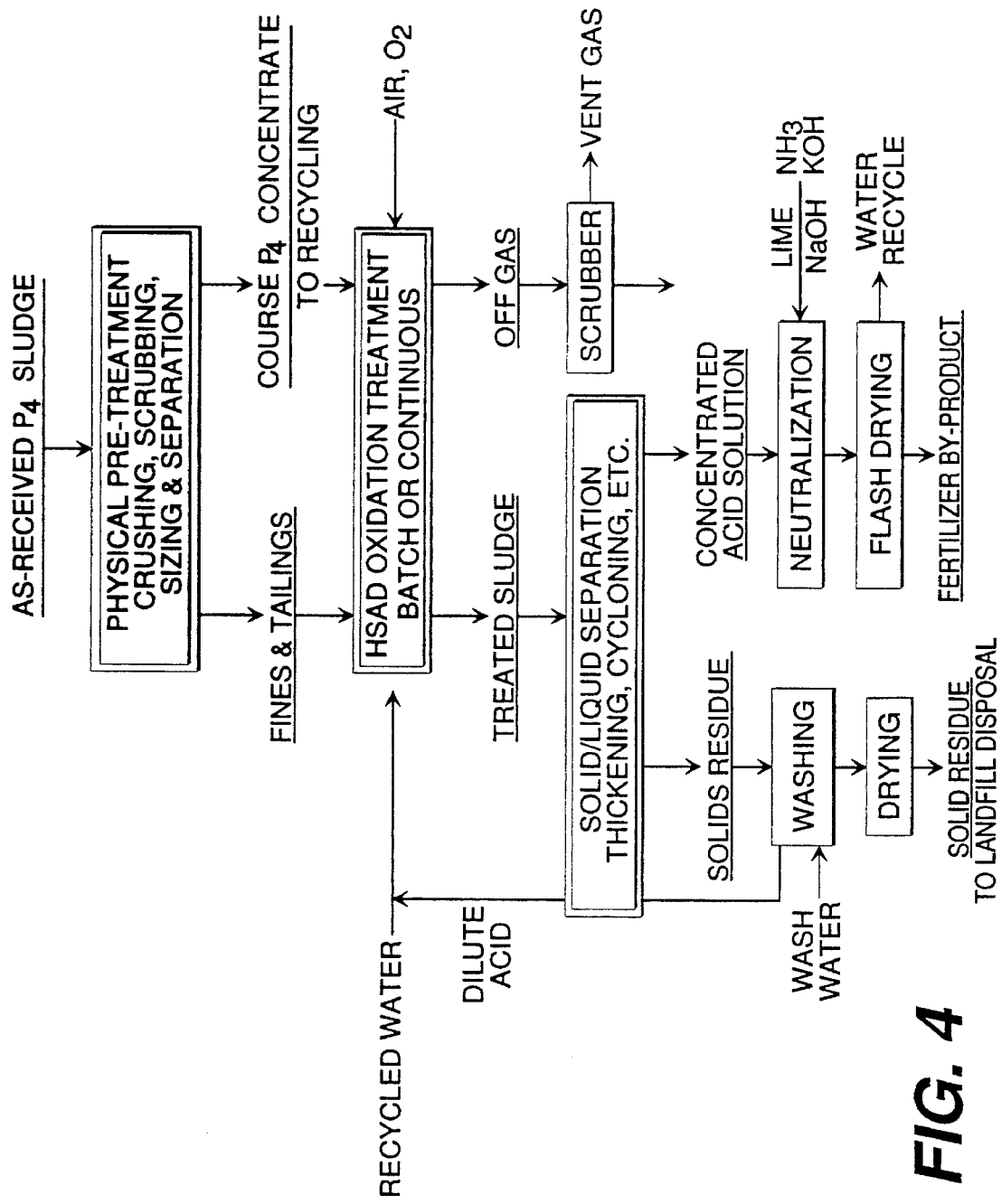
FIG. 4 is a flow chart of the process of the present invention for use in high phosphorus content sludge treatment.

For the treatment of high phosphorus sludges containing relatively high $P_4$ contents, greater than about 5–10%, the process flow diagram detailed in FIG. 4 is preferred. In this system the $P_4$-contaminated waste material is slurried, attrition scrubbed, and wet screened to prepare a uniformly sized feed and to recover any $P_4$-enriched coarse particles suitable for recycling. The fine size material is diluted with water or recycled dilute phosphoric acid and treated in the HSAD reactor 10 with a stream of finely dispersed bubbles 28 of the oxygen-containing gas mixture 24. The dissolved oxygen reacts quickly with the $P_4$-contaminants forming white fumes of water soluble oxyphosphorus compounds. Some fumes report to the off gas 40 steam and are scrubbed by a strong alkaline solution 52.

An almost complete oxidation is achieved when the evolution of white oxyphosphorus fumes cease and the sludge temperature starts to decline. The time required depends on the $P_4$ content of the sludge. Higher $P_4$ content requires longer oxidation. Finally, the treated sludge solids settle quickly, leaving a clear supernatent acid solution. Solid/liquid separation of the treated sludge can be achieved by thickening followed by filtration and/or centrifugation and washing using fresh water. The washed solid residue may be air dried or may be directly disposed of as landfill. The thickener overflow consists mainly of a clear concentrated acidic solution ($H_3PO_4$) which can be neutralized by ammonia, KOH, NaOH, lime or other alkalines to produce liquid fertilizer products that can be flash dried to a finished fertilizer by-product. The wash water (dilute $H_3PO_4$ acid) may be mixed with phossy water for recycling. The scrubbed phosphorus oxide fumes may be combined with the neutralized $H_3PO_4$ and recovered as fertilizer by-product. The scrubbed vent gas is clean and can be released into the atmosphere.

On the other hand, only the HSAD oxidation step and a modified product recovery step can be used to convert highly pure and concentrated $P_4$ suspensions or emulsion readily to food-grade phosphoric acid or chemicals.

The foregoing apparatus designs, application examples, and process flowsheets illustrate certain embodiments of the presented invention and should not be construed to limit the scope of the invention or its equivalents, which is set forth in the appended claims.

We claim:

1. An apparatus for treating material containing elemental phosphorus to convert the elemental phosphorus into oxyphosphorus compounds, said apparatus comprising:

(a) a first stage comprising means for receiving said material, said first stage functioning as a contact region for said material, said first stage having an off gas outlet formed therein for allowing gases produced while treating said material to flow out of said apparatus, said first stage-having an aperture formed therein for allowing said material to exit said first stage, wherein said material exits said first stage at a rate which is related to the amount of gases produced while treating said material; and (b) a second stage mechanically coupled to said first stage for receiving said material as it exits said first stage through the aperture formed in said first stage, said second stage comprising means for receiving an oxygen-containing gas stream introduced into said apparatus from outside said apparatus which oxygen-containing gas reacts with the elemental phosphorus contained in said material, said second stage comprising a bladed impeller operating at speeds ranging from 4,000 to 21,000 rpm for high speed and high shear mixing of said oxygen-containing gas stream and said material whereby the oxygen-containing gas stream is subdivided by the bladed impeller into bubbles having a diameter on the order of magnitude of approximately 1 micron which bubbles are dispersed in said material to facilitate the reaction between the oxygen-containing gas and the elemental phosphorus contained in said material whereby oxyphosphorus compounds are produced.

2. An apparatus for treating material containing elemental phosphorus according to claim 1, wherein said first stage further comprises a wash water injection port for injecting water into said first stage to dilute said material.

* * * * *